United States Patent
Chun et al.

(10) Patent No.: US 10,174,194 B2
(45) Date of Patent: *Jan. 8, 2019

(54) COPOLYCARBONATE AND COMPOSITION COMPRISING THE SAME

(71) Applicant: LG CHEM, LTD., Seoul (KR)

(72) Inventors: Byoung Kyu Chun, Daejeon (KR); Hyong Min Bahn, Daejeon (KR); Young Young Hwang, Daejeon (KR); Jung Jun Park, Daejeon (KR); Moo Ho Hong, Daejeon (KR); Ki Jae Lee, Daejeon (KR); Un Ko, Daejeon (KR); Young Wook Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/319,257

(22) PCT Filed: Dec. 2, 2015

(86) PCT No.: PCT/KR2015/013082
§ 371 (c)(1),
(2) Date: Dec. 15, 2016

(87) PCT Pub. No.: WO2016/089118
PCT Pub. Date: Jun. 9, 2016

(65) Prior Publication Data
US 2017/0137568 A1    May 18, 2017

(30) Foreign Application Priority Data

Dec. 4, 2014  (KR) .................. 10-2014-0173005
Dec. 1, 2015  (KR) .................. 10-2015-0169804

(51) Int. Cl.
*C08G 64/18* (2006.01)
*C08L 69/00* (2006.01)
(Continued)

(52) U.S. Cl.
CPC .............. *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/22* (2013.01); *C08G 64/24* (2013.01); *C08G 64/307* (2013.01); *C08G 64/38* (2013.01); *C08G 77/14* (2013.01); *C08G 77/20* (2013.01); *C08G 77/448* (2013.01); *C08J 5/00* (2013.01); *C08J 5/08* (2013.01); *C08K 5/005* (2013.01); *C08K 5/3475* (2013.01); *C08K 5/42* (2013.01); *C08K 5/521* (2013.01); *C08L 51/04* (2013.01); *C08L 69/005* (2013.01); *C08L 83/04* (2013.01); *C08L 83/06* (2013.01); *C08L 83/10* (2013.01); *C09K 21/14* (2013.01); *C08L 2201/08* (2013.01); *C08L 2201/10* (2013.01); *C08L 2205/02* (2013.01); *C08L 2205/025* (2013.01); *C08L 2205/03* (2013.01); *C08L 2205/035* (2013.01);
(Continued)

(58) Field of Classification Search
CPC ........................... C08G 64/186; C08G 77/448
See application file for complete search history.

(56) References Cited

U.S. PATENT DOCUMENTS 3,819,744 A    6/1974   Buechner et al.
5,137,949 A    8/1992   Paul et al.
(Continued)

FOREIGN PATENT DOCUMENTS

CN    101124282 A     2/2008
CN    101585961 A    11/2009
(Continued)

OTHER PUBLICATIONS

Hwang, et al.: "Production of impact strength and fluidity-improved polycarbonate and composition comprising same", Chemical Abstract for US2016/0251481A1, Mar. 24, 2016.
Chemical Abstract registry No. 163617-00-3, Jun. 8, 1995.

*Primary Examiner* — David J Buttner
(74) *Attorney, Agent, or Firm* — Dentons US LLP

(57) ABSTRACT

Disclosed is a copolycarbonate having an aromatic polycarbonate-based first repeating unit and one or more aromatic polycarbonate-based second repeating units having siloxane bonds, where the copolycarbonate provides an improved residence heat stability, and where the second repeating unit includes a repeating unit represented by Chemical Formula 2 and a repeating unit represented by Chemical Formula 3:

[Chemical Formula 2]

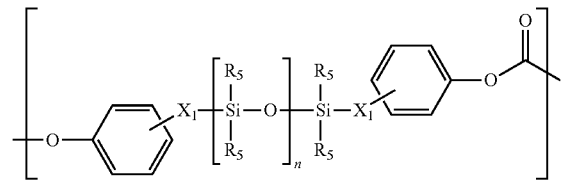

[Chemical Formula 3]

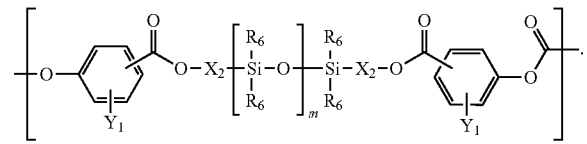

14 Claims, No Drawings

(51) Int. Cl.

| | |
|---|---|
| *C08G 64/38* | (2006.01) |
| *C08G 77/448* | (2006.01) |
| *C08J 5/00* | (2006.01) |
| *C08G 64/16* | (2006.01) |
| *C08G 64/06* | (2006.01) |
| *C08G 64/30* | (2006.01) |
| *C08G 64/08* | (2006.01) |
| *C08K 5/3475* | (2006.01) |
| *C08L 83/04* | (2006.01) |
| *C08G 64/24* | (2006.01) |
| *C08L 83/10* | (2006.01) |
| *C08K 5/00* | (2006.01) |
| *C08G 64/22* | (2006.01) |
| *C08G 77/14* | (2006.01) |
| *C08L 83/06* | (2006.01) |
| *C08J 5/08* | (2006.01) |
| *C08K 5/521* | (2006.01) |
| *C08L 51/04* | (2006.01) |
| *C08K 5/42* | (2006.01) |
| *C09K 21/14* | (2006.01) |
| *C08G 77/20* | (2006.01) |

(52) U.S. Cl.
  CPC ....... *C08L 2205/05* (2013.01); *C08L 2205/06* (2013.01); *C08L 2207/53* (2013.01)

(56) References Cited

U.S. PATENT DOCUMENTS

| | | | |
|---|---|---|---|
| 5,324,454 A | 6/1994 | Takata et al. | |
| 5,380,795 A | 1/1995 | Gosens et al. | |
| 5,455,310 A | 10/1995 | Hoover et al. | |
| 5,502,134 A | 3/1996 | Okamoto et al. | |
| 5,530,083 A | 6/1996 | Phelps et al. | |
| 5,608,026 A | 3/1997 | Hoover et al. | |
| 5,783,651 A | 7/1998 | König et al. | |
| 5,932,677 A | 8/1999 | Hoover et al. | |
| 6,001,929 A | 12/1999 | Nodera et al. | |
| 6,252,013 B1 | 6/2001 | Banach et al. | |
| 6,281,286 B1 | 8/2001 | Chorvath et al. | |
| 6,780,956 B2 | 8/2004 | Davis | |
| 7,135,538 B2 | 11/2006 | Glasgow et al. | |
| 7,332,559 B2 | 2/2008 | Hong et al. | |
| 7,365,125 B2 | 4/2008 | Govaerts et al. | |
| 7,432,327 B2 | 10/2008 | Glasgow | |
| 7,498,401 B2 | 3/2009 | Agarwal | |
| 7,524,919 B2 | 4/2009 | Hoover et al. | |
| 7,691,304 B2 | 4/2010 | Agarwal et al. | |
| 7,709,562 B2 | 5/2010 | Li et al. | |
| 7,709,581 B2 | 5/2010 | Glasgow et al. | |
| 7,718,733 B2 | 5/2010 | Juikar et al. | |
| 8,030,379 B2 | 10/2011 | Nodera et al. | |
| 8,084,134 B2 | 12/2011 | Malinoski et al. | |
| 8,124,683 B2 | 2/2012 | Jung et al. | |
| 8,389,648 B2 | 3/2013 | Adoni et al. | |
| 8,466,249 B2 | 6/2013 | Gallucci et al. | |
| 8,552,096 B2 | 10/2013 | Li et al. | |
| 8,912,290 B2 | 12/2014 | Huggins et al. | |
| 8,933,186 B2 | 1/2015 | Bahn et al. | |
| 8,962,780 B2 | 2/2015 | Higaki et al. | |
| 8,981,017 B2 | 3/2015 | Ishikawa | |
| 9,062,164 B2 | 6/2015 | Kim et al. | |
| 9,080,021 B2 | 7/2015 | Ishikawa et al. | |
| 9,102,832 B2 | 8/2015 | Sybert et al. | |
| 9,255,179 B2 | 2/2016 | Park et al. | |
| 9,505,929 B2 | 11/2016 | Natarajan et al. | |
| 9,745,417 B2* | 8/2017 | Hwang | C08G 64/24 |
| 9,745,466 B2* | 8/2017 | Park | C08G 64/24 |
| 9,751,979 B2* | 9/2017 | Son | C08G 64/24 |
| 9,777,112 B2* | 10/2017 | Park | C08G 64/085 |
| 9,809,677 B2* | 11/2017 | Park | C08G 64/085 |
| 9,840,585 B2* | 12/2017 | Park | C08G 64/085 |
| 9,868,818 B2* | 1/2018 | Park | C08G 64/38 |
| 2003/0027905 A1 | 2/2003 | Mahood et al. | |
| 2003/0065122 A1 | 4/2003 | Davis | |
| 2004/0200303 A1 | 10/2004 | Inoue et al. | |
| 2006/0148986 A1 | 7/2006 | Glasgow et al. | |
| 2007/0093629 A1 | 4/2007 | Silva et al. | |
| 2007/0135569 A1 | 6/2007 | Derudder | |
| 2007/0241312 A1 | 10/2007 | Hikosaka | |
| 2007/0258412 A1 | 11/2007 | Schilling et al. | |
| 2008/0015289 A1 | 1/2008 | Siripurapu | |
| 2008/0081895 A1 | 4/2008 | Lens et al. | |
| 2008/0230751 A1 | 9/2008 | Li et al. | |
| 2009/0087761 A1 | 4/2009 | Fukushima et al. | |
| 2009/0326183 A1 | 12/2009 | Schultz et al. | |
| 2010/0233603 A1 | 9/2010 | Hikosaka | |
| 2012/0123034 A1 | 5/2012 | Morizur et al. | |
| 2012/0251750 A1 | 10/2012 | Sybert et al. | |
| 2012/0252985 A1 | 10/2012 | Rosenquist et al. | |
| 2012/0271009 A1 | 10/2012 | Higaki et al. | |
| 2012/0283393 A1 | 11/2012 | Ishikawa | |
| 2013/0003544 A1 | 1/2013 | Wermuth et al. | |
| 2013/0082222 A1 | 4/2013 | Aoki | |
| 2013/0186799 A1 | 7/2013 | Stam et al. | |
| 2013/0190425 A1 | 7/2013 | Zhu et al. | |
| 2013/0261235 A1 | 10/2013 | Minemura et al. | |
| 2013/0267665 A1 | 10/2013 | Huggins et al. | |
| 2013/0274392 A1 | 10/2013 | Morizur et al. | |
| 2013/0289224 A1 | 10/2013 | Bae et al. | |
| 2013/0309474 A1 | 11/2013 | Peek et al. | |
| 2013/0313493 A1 | 11/2013 | Wen et al. | |
| 2013/0317142 A1 | 11/2013 | Chen et al. | |
| 2013/0317146 A1 | 11/2013 | Li et al. | |
| 2013/0317148 A1 | 11/2013 | Zheng et al. | |
| 2013/0317150 A1 | 11/2013 | Wan et al. | |
| 2013/0331492 A1 | 12/2013 | Sharma | |
| 2014/0058024 A1 | 2/2014 | Son et al. | |
| 2014/0106208 A1 | 4/2014 | Ishikawa et al. | |
| 2014/0148559 A1 | 5/2014 | Kim et al. | |
| 2014/0179843 A1 | 6/2014 | Van Der Mee et al. | |
| 2014/0206802 A1 | 7/2014 | Bahn et al. | |
| 2014/0256888 A1 | 9/2014 | Ishikawa et al. | |
| 2014/0323623 A1 | 10/2014 | Miyake et al. | |
| 2015/0057423 A1 | 2/2015 | Kim et al. | |
| 2015/0175802 A1 | 6/2015 | Sybert et al. | |
| 2015/0183985 A1 | 7/2015 | Hong et al. | |
| 2015/0197633 A1 | 7/2015 | Van Der Mee et al. | |
| 2015/0210854 A1 | 7/2015 | Aoki | |
| 2015/0218371 A1 | 8/2015 | Lee et al. | |
| 2015/0307706 A1 | 10/2015 | Rosenquist et al. | |
| 2015/0315380 A1 | 11/2015 | Bahn et al. | |
| 2015/0344623 A1 | 12/2015 | Park et al. | |
| 2015/0368484 A1 | 12/2015 | Shishaku et al. | |
| 2016/0002410 A1 | 1/2016 | Iyer et al. | |
| 2016/0017102 A1 | 1/2016 | Yamada | |
| 2016/0083527 A1 | 3/2016 | Mittal et al. | |
| 2016/0122477 A1 | 5/2016 | Rhee et al. | |
| 2016/0208075 A1* | 7/2016 | Aoki | C08L 69/00 |
| 2016/0251481 A1 | 9/2016 | Hwang et al. | |
| 2016/0297926 A1* | 10/2016 | Hwang | C08G 77/448 |
| 2016/0326312 A1 | 11/2016 | Park et al. | |
| 2016/0326313 A1 | 11/2016 | Son et al. | |
| 2016/0326314 A1 | 11/2016 | Son et al. | |
| 2016/0326321 A1 | 11/2016 | Park et al. | |
| 2016/0369047 A1 | 12/2016 | Hwang et al. | |
| 2016/0369048 A1 | 12/2016 | Park et al. | |
| 2017/0158852 A1* | 6/2017 | Ko | C08G 64/24 |
| 2017/0306146 A1 | 10/2017 | Lee et al. | |
| 2017/0321014 A1 | 11/2017 | Lee et al. | |

FOREIGN PATENT DOCUMENTS

| | | | |
|---|---|---|---|
| CN | 102471474 A | 5/2012 | |
| CN | 102933657 A | 2/2013 | |
| CN | 103443201 A | 12/2013 | |
| CN | 103827217 A | 5/2014 | |
| CN | 103958573 A | 7/2014 | |
| CN | 104066773 A | 9/2014 | |
| CN | 104321382 A | 1/2015 | |
| CN | 104837895 A | 8/2015 | |

(56) References Cited

FOREIGN PATENT DOCUMENTS

| | | |
|---|---|---|
| CN | 105899576 A | 8/2016 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| KR | 10-1664844 B1 | 10/2016 |
| TW | 201241043 A | 10/2012 |
| WO | 2012/060516 A1 | 5/2012 |
| WO | 2013/051557 A1 | 4/2013 |
| WO | 2013-058214 A1 | 4/2013 |
| WO | 2013-066000 A1 | 5/2013 |
| WO | 2013/073709 A1 | 5/2013 |
| WO | 2013/100606 A1 | 7/2013 |
| WO | 2013-115538 A1 | 8/2013 |
| WO | 2013/115604 A1 | 8/2013 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2014/179206 A2 | 11/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |
| WO | WO 2016/089026 * | 6/2016 |
| WO | WO 2016/089136 * | 6/2016 |
| WO | WO 2016/089137 * | 6/2016 |

\* cited by examiner

COPOLYCARBONATE AND COMPOSITION COMPRISING THE SAME

CROSS-REFERENCE TO RELATED APPLICATION(S)

This application is a National Stage Entry of International Application No. PCT/KR2015/013082, filed Dec. 2, 2015, and claims the benefit of and priority to Korean Application No. 10-2014-0173005, filed on Dec. 4, 2014, and Korean Application No. 10-2015-0169804, filed on Dec. 1, 2015, all of which are hereby incorporated by reference in their entirety for all purposes as if fully set forth herein.

TECHNICAL FIELD

The present invention relates to a copolycarbonate and a composition comprising the same, and more specifically to a copolycarbonate being economically produced, and having excellent residence heat stability, and to a composition comprising the same.

BACKGROUND OF ART

Polycarbonate resins are prepared by condensation-polymerization of an aromatic diol such as bisphenol A with a carbonate precursor such as a phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and a heat stability is low.

Given the above circumstances, the present inventors have conducted intensive studies to overcome the above-mentioned disadvantages encountered with the prior arts and develop a copolycarbonate having improved heat stability. As a result, the inventors have found that a copolycarbonate in which a specific siloxane compound is introduced in a main chain of the polycarbonate as described below satisfies the above-described properties, thereby completing the present invention.

DETAILED DESCRIPTION OF THE INVENTION

Technical Problem

It is an object of the present invention to provide a copolycarbonate having excellent residence heat stability.

It is a further object of the present invention to provide a composition comprising the above-mentioned copolycarbonate.

Technical Solution

In order to achieve these objects, the present invention provides a copolycarbonate comprising: an aromatic polycarbonate-based first repeating unit; and one or more aromatic polycarbonate-based second repeating units having siloxane bonds, and having $\Delta YI$ of 0.5 to 5 as measured according to the following Equation 1:

$$\Delta YI = YI(320°\ C., 15\ \text{minutes}) - YI(320°\ C., 0\ \text{minute}) \quad \text{[Equation 1]}$$

in the Equation 1,

YI (320° C., 0 minute) is YI (Yellow Index) measured in accordance with ASTM 01925 with respect to a specimen (width/length/thickness=60 mm/40 mm/3 mm) which is obtained by injection-molding the copolycarbonate at 320° C., and YI (320° C., 15 minutes) is YI (Yellow Index) measured in accordance with ASTM D1925 with respect to a specimen (width/length/thickness=60 mm/40 mm/3 mm) which is obtained by residing the copolycarbonate at 320° C. for 15 minutes and then conducting injection molding.

When preparing a product using a copolycarbonate, the product is generally formed by the injection molding method. During the injection molding, a high temperature is applied to the copolycarbonate for a certain period of time and thus deformation such as thermal decomposition may be generated in this process. Therefore, in order to increase the applicability of a copolycarbonate, the deformation caused by the injection process should be minimized, and in order to evaluate this, the 'residence heat stability' is evaluated in the present invention.

As used herein, the term 'residence heat stability' means that the copolycarbonate is resided at a certain high temperature for a certain period of time and then injected to prepare a specimen, and YI (Yellow Index) of the specimen is measured and then compared with that of a specimen injected without residence. In particular, in the present invention, the conditions of residing the specimen at 320° C. for 15 minutes as shown in the Equation 1 are applied.

When the residence heat stability is excellent, deformation such as thermal decomposition is hardly generated even when being resided at a high temperature for a certain period of time, and thus there is no big difference as compared with YI (Yellow Index) of the specimen injected without residence.

In particular, the copolycarbonate according to the present invention has $\Delta YI$ of 0.5 to 5 as measured according to the Equation 1. Preferably, $\Delta YI$ measured according to the Equation 1 is not more than 4.5, not more than 4.0, not more than 3.5, not more than 3.0, not more than 2.5, not more than 2.0, not more than 1.9, not more than 1.8, not more than 1.7, not more than 1.6, or not more than 1.5.

In addition, a smaller amount of $\Delta YI$ means excellent residence heat stability, and it is not limited to any lower limit value. As one example, however, it is preferably not less than 0.5, not less than 0.6, not less than 0.7, not less than 0.8, not less than 0.9, or not less than 1.0.

Further, preferably, the copolycarbonate according to the present invention has YI (320° C., 15 minutes) of greater than 0, not more than 9, not more than 8, not more than 7, not more than 6, or not more than 5. Further, preferably, the copolycarbonate according to the present invention has YI (320° C., 0 minute) of greater than 0, not more than 5, or not more than 4.

Further, preferably, the copolycarbonate according to the present invention has impact strength at low temperature of 600 to 1000 J/m as measured at −30° C. in accordance with ASTM D256(⅛ inch, Notched Izod).

Further, preferably, the copolycarbonate according to the present invention has a weight average molecular weight of 1,000 to 100,000 g/mol and preferably 15,000 to 35,000 g/mol. Within this range of the weight average molecular weight, the copolycarbonate has an effect of providing excellent resisence heat stability.

More preferably, the above weight average molecular weight is not less than 20,000 g/mol, not less than 21,000 g/mol, not less than 22,000 g/mol, not less than 23,000 g/mol, not less than 24,000 g/mol, not less than 25,000 g/mol, not less than 26,000 g/mol, not less than 27,000 g/mol, or not less than 28,000 g/mol. Also, the above weight average molecular weight is not more than 34,000 g/mol, not more than 33,000 g/mol, or not more than 32,000 g/mol.

Further, preferably, the copolycarbonate according to the present invention has melt index of 3 to 20 g/10 min as measured in accordance with ASTM D1238 (conditions of 300° C. and 1.2 kg).

More preferably, the melt index is not less than 5 g/10 min, not less than 6 g/10 min, not less than 7 g/10 min, or not less than 8 g/10 min; and not more than 15 g/10 min, not more than 14 g/min, not more than 13 g/min, or not more than 12 g/10 min.

Further, preferably, the copolycarbonate according to the present invention comprises two kinds of aromatic polycarbonate-based second repeating units having siloxane bonds.

Further, preferably, in the copolycarbonate according to the present invention, the content of the aromatic polycarbonate-based first repeating units is 90 to 99%, relative to the total weight of the aromatic polycarbonate-based first repeating units and the one or more aromatic polycarbonate-based second repeating units having siloxane bonds. Within this range of the content, the copolycarbonate has an effect of providing excellent residence heat stability.

More preferably, the content of the aromatic polycarbonate-based first repeating units is not less than 91%, not less than 92%, not less than 93%, or not less than 94%; and not more than 98%, not more than 97%, or not more than 96%, relative to the total weight of the aromatic polycarbonate-based first repeating units and the one or more aromatic polycarbonate-based second repeating units having siloxane bonds. Further, the above content may be determined based on the weight ratio of the aromatic diol compounds and siloxane compounds to be described later.

Further, in the copolycarbonate according to the present invention, the aromatic polycarbonate-based first repeating unit is preferably formed by reacting an aromatic diol compound and a carbonate precursor, and it is more preferably represented by the following Chemical Formula 1:

[Chemical Formula 1]

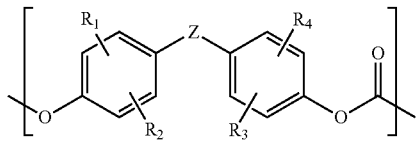

in the Chemical Formula 1, $R_1$, $R_2$, $R_3$ and $R_4$ are each independently hydrogen, $C_{1-10}$ alkyl, $C_{1-10}$ alkoxy, or halogen, Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, in the Chemical Formula 1, $R_1$, $R_2$, $R_3$ and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

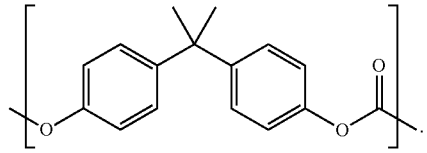

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

Further, preferably, in the copolycarbonate according to the present invention, the one or more aromatic polycarbonate-based second repeating units having siloxane bonds are formed by reacting one or more siloxane compounds and a carbonate precursor, and more preferably it comprises a repeating unit represented by the following Chemical Formula 2 and a repeating unit represented by the following Chemical Formula 3:

[Chemical Formula 2]

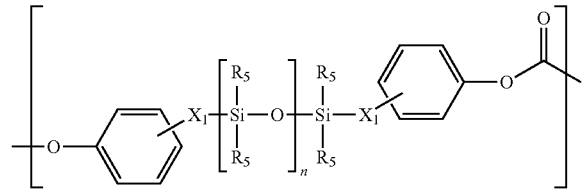

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 3]

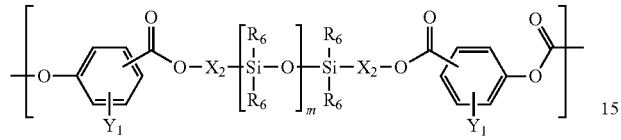

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; or $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

In Chemical Formula 2, each of $X_1$ is independently preferably $C_{2-10}$ alkylene, more preferably $C_{2-4}$ alkylene and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 50, not more than 45, not more than 40, not more than 39, not more than 38, or not more than 37.

In Chemical Formula 3, each of $X_2$ is independently preferably $C_{2-10}$ alkylene, more preferably $C_{2-6}$ alkylene and most preferably isobutylene.

Further, preferably, $Y_1$ is hydrogen.

Further, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each of $R_6$ is independently $C_{1-10}$ alkyl, more preferably $C_{1-6}$ alkyl, more preferably $C_{1-3}$ alkyl, and most preferably methyl.

Preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are, respectively, derived from a siloxane compound represented by the following Chemical Formula 2-1 and a siloxane compound represented by the following Chemical Formula 3-1:

[Chemical Formula 2-1]

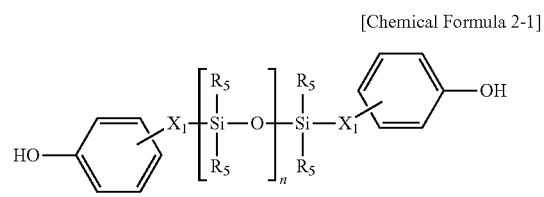

in the Chemical Formula 2-1, $X_1$, $R_5$ and n are the same as previously defined,

[Chemical Formula 3-1]

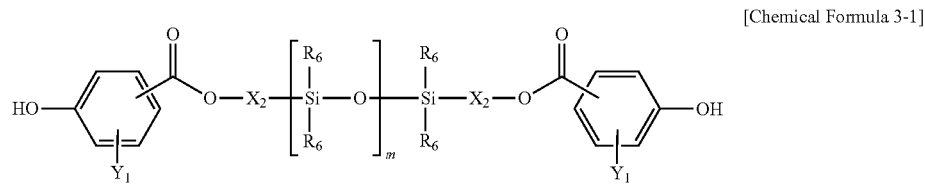

in the Chemical Formula 3-1, $X_2$, $Y_1$, $R_6$ and m are the same as previously defined.

As used herein, 'derived from a siloxane compound' means that a hydroxy group of the respective siloxane compound and a carbonate precursor are reacted to form the repeating unit represented by Chemical Formula 2 and the repeating unit represented by the Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2, respectively:

[Reaction Scheme 1]

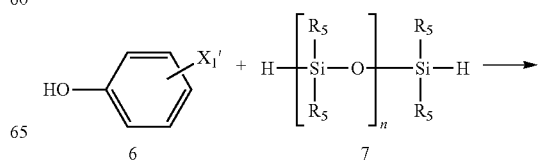

-continued

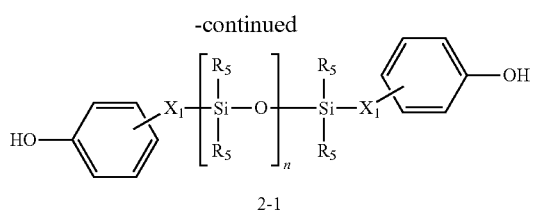

2-1 in the Reaction Scheme 1,
$X_1'$ is $C_{2-10}$ alkenyl, and
$X_1$, $R_5$ and n are the same as previously defined,

[Reaction Scheme 2]

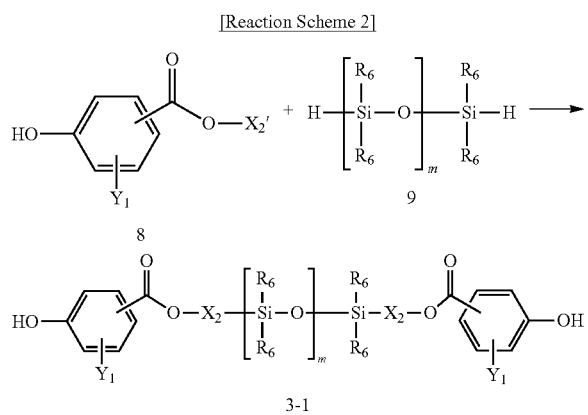

3-1 in the Reaction Scheme 2,
$X_2'$ is $C_{2-10}$ alkenyl, and
$X_2$, $Y_1$, $R_6$ and m are the same as previously defined.

In Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Larnoreaux catalyst, Speier catalyst, $PtCl_2$ (COD), $PtCl_2$(benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by the Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 can be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphe-nyldisiloxane. In addition, the above organocyclosiloxane may include, for example, organocyclotetrasiloxane. As one example thereof, octamethylcyclotetrasiloxane and octaphenylcyclotetrasiloxane or the like can be included.

The above organodisiloxane can be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; or not more than 10 parts by weight, not more than 5 parts by weight or not more than 3 parts by weight, based on 100 parts by weight of the organocyclosiloxane.

In particular, by adjusting the content of the repeating unit represented by Chemical Formula 2 and the repeating unit represented by Chemical Formula 3, the impact strength at low temperature and YI (Yellow Index) of the copolycarbonate can be improved simultaneously. Preferably, the weight ratio between the above repeating units may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 2-1 and the siloxane compound represented by Chemical Formula 3-1.

Preferably, the repeating unit represented by Chemical Formula 2 is represented by the following Chemical Formula 2-2:

[Chemical Formula 2-2]

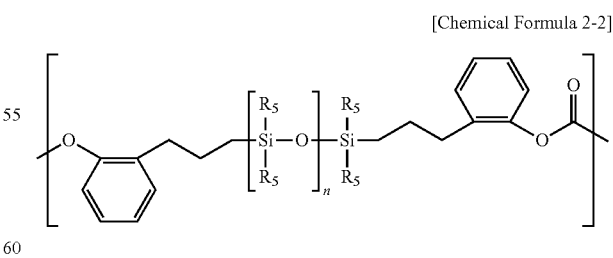

in the Chemical Formula 2-2, $R_5$ and n are the same as previously defined. Preferably, $R_5$ is methyl.

Also, preferably, the repeating unit represented by Chemical Formula 3 is represented by the following Chemical Formula 3-2:

[Chemical Formula 3-2]

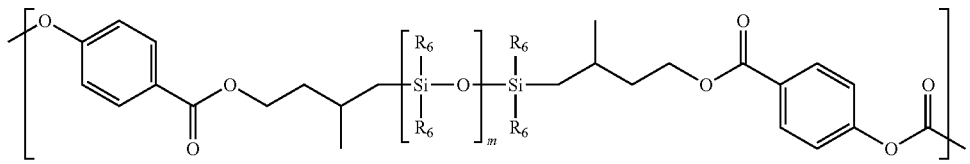

in the Chemical Formula 3-2, $R_6$ and m are the same as previously defined. Preferably, $R_6$ is methyl.

Further, the copolycarbonate according to the present invention comprises all of the repeating unit represented by Chemical Formula 1-1, the repeating unit represented by Chemical Formula 2-2, and the repeating unit represented by Chemical Formula 3-2.

Further, the present invention provides a method for preparing a copolycarbonate comprising a step of polymerizing the aromatic diol compound, the carbonate precursor and the one or more siloxane compounds.

The aromatic diol compound, the carbonate precursor and one or more siloxane compounds are the same as previously described.

During the polymerization, one or more siloxane compounds can be used in an amount of not less than 0.1% by weight, not less than 0.5% by weight, not less than 1% by weight, or not less than 1.5% by weight; and not more than 20% by weight, not more than 10% by weight, not more than 7% by weight, not more than 5% by weight, not more than 4% by weight, not more than 3% by weight or not more than 2% by weight, based on 100% by weight in total of the aromatic diol compound, the carbonate precursor and one or more siloxane compounds. Also, the above aromatic diol compound can be used in an amount of not less than 40% by weight, not less than 50% by weight, or not less than 55% by weight; and not more than 80% by weight, not more than 70% by weight, or not more than 65% by weight, based on 100% by weight in total of the aromatic diol compound, the carbonate precursor and one or more siloxane compounds. The above carbonate precursor can be used in an amount of not less than 10% by weight, not less than 20% by weight, or not less than 30% by weight; and not more than 60% by weight, not more than 50% by weight, or not more than 40 by weight, based on 100% by weight in total of the aromatic diol compound, the carbonate precursor and one or more siloxane compounds.

Further, as the polymerization method, an interfacial polymerization method can be used as one example. In this case, there is an effect in that the polymerization reaction is possible at low temperature and atmospheric pressure, and control of molecular weight is easy. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene can be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight, and in an amount of not more than 10 parts by weight, not more than 6 parts by weight, or not more than 5 parts by weight, based on 100 parts by weight of the aromatic diol compound. Within this range, the required molecular weight can be obtained.

In addition, the present invention provides a polycarbonate composition comprising the above-mentioned copolycarbonate and polycarbonate. The copolycarbonate may be used alone, but it can be used together with the polycarbonate as needed to control the physical properties of the copolycarbonate.

The above polycarbonate is distinguished from the copolycarbonate according to the present invention in that a polysiloxane structure Is not introduced into the main chain of the polycarbonate.

Preferably, the above polycarbonate comprises a repeating unit represented by the following Chemical Formula 4:

[Chemical Formula 4]

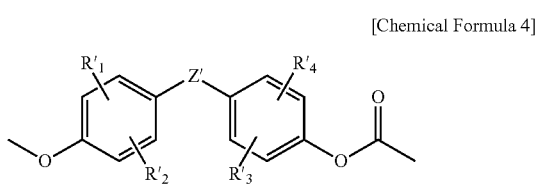

in the Chemical Formula 4, $R'_1$, $R'_2$, $R'_3$ and $R'_4$ are each independently hydrogen, $C_{1-10}$ alkyl, $C_{1-10}$ alkoxy, or halogen, $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

The repeating unit represented by Chemical Formula 4 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$, $R'_2$, $R'_3$, $R'_4$ and $Z'$ in Chemical Formula 4 are the same as previously described for $R_1$, $R_2$, $R_3$, $R_4$ and Z in Chemical Formula 1, respectively.

Further, preferably, the repeating unit represented by Chemical Formula 4 is represented by the following Chemical Formula 4-1:

[Chemical Formula 4-1]

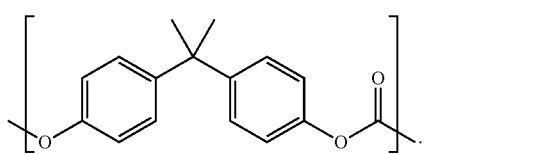

In the polycarbonate composition, the weight ratio of the copolycarbonate and the polycarbonate is preferably from 99:1 to 1:99, more preferably from 90:10 to 50:50, and most preferably from 80:20 to 60:40.

In addition, the present invention provides an article comprising the above-mentioned copolycarbonate or the polycarbonate composition.

Preferably, the above article is an injection molded article. In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

As described above, the copolycarbonate according to the present invention has an excellent residence thermal stability, and thus deformation such as thermal decomposition is hardly generated even at a high temperature applied for the injection molding. Therefore, the original characteristics of the copolycarbonate can be maintained in the manufacturing process of the injection molded article, and a change such as a change of color is hardly generated.

The method for preparing the article may comprise the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, according to the present invention, the copolycarbonate in which a specific siloxane compound is introduced in a main chain of the polycarbonate has effects of providing excellent residence heat stability.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1: AP-PDMS (n=34)

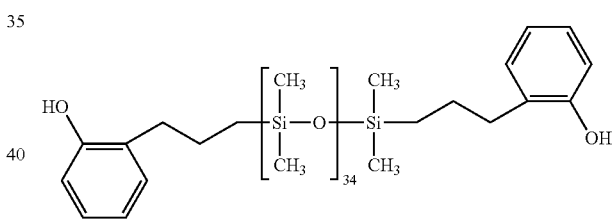

47.60 g (160 mmol) of octamethylcyclotetrasiloxane and 2.40 g (17.8 mmol) of tetramethyldisiloxane were mixed. The mixture was then placed in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as AP-PDMS (n=34). AP-PDMS was pale yellow oil and the repeating unit (n) was 34 when confirmed through $^1$H NMR using a Varian 500 MHz, and further purification was not required.

Preparation Example 2: MBHB-PDMS (m=58)

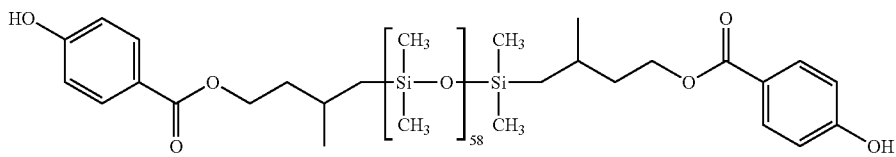

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3), relative to 100 parts by weight of octamethylcyclotetrasiloxane, and reacted at 60° C. for 4 hours.

After completion of the reaction, the reaction product was diluted with ethyl acetate and quickly filtered using a celite. The repeating unit (m) of the terminal-unmodified polyorganosiloxane thus prepared was 58 when confirmed through $^1$H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as MBHB-PDMS (m=58). MBHB-PDMS was pale yellow oil and the repeating unit (m) was 58 when confirmed through $^1$H NMR using a Varian 500 MHz, and further purification was not required.

Preparation Example 3: Eugenol-PDMS

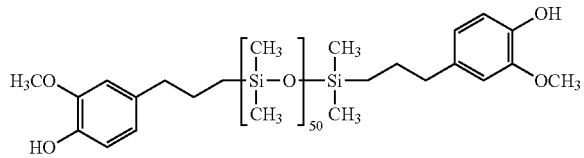

47.60 g (160 mmol) of octamethylcyclotetrasiloxane and 1.7 g (13 mmol) of tetramethyldisiloxane were mixed. The mixture was then placed in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 50 when confirmed through $^1$H NMR.

To the resulting terminal-unmodified polyorganosiloxane, 6.13 g (29.7 mmol) of Eugenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as Eugenol-PDMS. Eugenol-PDMS was a pale yellow oil and the repeating unit n) was 50 when confirmed through $^1$H NMR using a Varian 500 MHz, and further purification was not required.

Example 1

1784 g of water, 385 g of NaOH and 232 g of BPA (bisphenol A) were added to a polymerization reactor, and dissolved with mixing under a $N_2$ atmosphere. 4.3 g of PTBP (para-tert butylphenol) and the mixed solution of 5.91 g of AP-PDMS (n=34) prepared in Preparation Example 1 and 0.66 g of MBHB-PDMS (m=58) prepared in Preparation Example 2 were dissolved in MC (methylene chloride) and then added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and then pH of a produced polymer was adjusted to neutral pH of 6 to 7 by washing three times with distilled water. The polymer thus obtained was re-precipitated in a mixed solution of methanol and hexane, and then dried at 120° C. to give a final copolycarbonate.

Comparative Example 1

1784 g of water, 385 g of NaOH and 232 g of BPA (bisphenol A) were added to a polymerization reactor, and dissolved with mixing under a $N_2$ atmosphere. 4.3 g of PTBP (para-tert butylphenol) and 6.57 g of AP-PDMS (n=34) was dissolved in MC (methylene chloride) and added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to to 4 to remove TEA, and the pH of a produced polymer was adjusted to neutral pH of 6-7 by washing three times with distilled water. The polymer thus obtained was re-precipitated in a mixed solution of methanol and hexane, and then dried at 120° C. to give a final copolycarbonate.

Comparative Example 2

The copolycarbonate was prepared by the same method as in Comparative Example 1, except that Eu-PDMS (n=50) prepared in Preparation Example 3 was used instead of AP-PDMS (n=34) prepared in Preparation Example 1.

Comparative Example 3

The copolycarbonate was prepared by the same method as in Comparative Example 1, except that AP-PDMS (n=34) prepared in Preparation Example 1 was not used.

Example 2

80 parts by weight of the copolycarbonate prepared in Example 1 and 20 parts by weight of the polycarbonate prepared in Comparative Example 3 were mixed to prepare a polycarbonate composition.

Example 3

The copolycarbonate was prepared by the same method as in Example 1, except that 6.24 g of AP-PDMS (n=34) prepared in Preparation Example 1 and 0.33 g of MBHB-PDMS (m=58) prepared in Preparation Example 2 were used.

Experimental Example: Confirmation of Characteristics

The weight average molecular weight of the copolycarobates and polycarbonate composition prepared in the examples and comparative examples were measured by GPO using PC Standard with Agilent 1200 series. Also, the melt index (MI) was measured in accordance with ASTM 01238 (conditions of 300° C. and 1.2 kg).

In addition, with respect to 1 part by weight of the respective copolycarbonate and polycarbonate composition prepared in the examples and comparative examples, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a ϕ30 mm twin-screw extruder provided with a vent, and was injection-molded at a cylinder temperature of 300° C. and a mold temperature of 80° C. using an injection molding machine N-20C (manufactured by JSW Co., Ltd.) to prepare a desired specimen. Using this, the impact strength at low temperature was measured at −30° C. in accordance with ASTM 0256 (⅛ inch, Notched Izod).

The residence heat stability was measured as follows.

The copolycarbonate and polycarbonate composition prepared in the examples and comparative examples were was pelletized using a ϕ30 mm twin-screw extruder provided with a vent, and was injection-molded without residence time at a cylinder temperature of 320° C. and a mold temperature of 90° C. using an injection molding machine N-20C (manufactured by JSW, Ltd.) to prepare a specimen (width/length/thickness=60 mm/40 mm/3 mm). YI (320° C., 0 minute) was measured using Color-Eye 7000A (manufactured by X-Rite Ltd.) in accordance with ASTM D1925.

Further, the above-described procedures are repeated, but the copolycarbonate and the polycarbonate composition were charged into cylinder and made to reside therein for 15 minutes. Then, a specimen (width/length/thickness=60 mm/40 mm/3 mm) was prepared by injection molding. YI (320° C., 15 minutes) was measured using Color-Eye 7000A (manufactured by X-Rite Ltd.) in accordance with ASTM D1925.

The value obtained by subtracting YI (320° C., 0 minute) from YI (320° C., 15 minutes) was represented as ΔYI.

In this case, the measurement condition of YI (Yellow Index) was as follows.

Measurement temperature: room temperature (23° C.)

Aperture size: Large area of view

Measurement method: transmittance was measured in a spiral range (360 nm to 750 nm)

The above results are shown in Table 1 below.

TABLE 1

|  | Ex.1 | Ex.2 | Ex.3 | C.EX.1 | C.EX.2 | C.EX.3 |
|---|---|---|---|---|---|---|
| Weight average molecular weight (g/mol) | 30,000 | 28,000 | 30,200 | 30,000 | 30,000 | 30,000 |
| YI (320° C., 15 min) | 4.61 | 4.03 | 4.50 | 9.71 | 14.74 | 3.24 |
| YI (320° C., 0 min) | 3.11 | 2.43 | 3.10 | 3.71 | 6.74 | 1.24 |
| ΔYI | 1.5 | 1.6 | 1.4 | 6.0 | 8.0 | 2.0 |
| MFR (g/10 min) | 3.5 | 10 | 4 | 8 | 7 | 10 |
| Impact strength at low-temperature (J/m) | 730 | 680 | 760 | 530 | 670 | 150 |

As shown in Table 1 above, it could be confirmed that Examples 1 to 3 exhibited significantly low ΔYI as compared with comparative examples, thereby exhibiting significantly high residence heat stability.

The invention claimed is:

1. A copolycarbonate comprising: an aromatic polycarbonate-based first repeating unit, and one or more aromatic polycarbonate-based second repeating units having siloxane bonds, and having ΔYI of 0.5 to 2 as measured according to the following Equation 1:

$$\Delta YI = YI(320°\ C., 15\ minutes) - YI(320°\ C., 0\ minute) \quad \text{[Equation 1]}$$

in the Equation 1,

YI (320° C., 0 minute) is YI (Yellow Index) measured in accordance with ASTM D1925 with respect to a specimen (width/length/thickness=60 mm/40 mm/3 mm) which is obtained by injection-molding the copolycarbonate at 320° C. and YI (320° C., 15 minutes) is YI (Yellow Index) measured in accordance with ASTM D1925 with respect to a specimen (width/length/thickness=60 mm/40 mm/3 mm) which is obtained by residing the copolycarbonate at 320° C. for 15 minutes and then conducting injection molding, wherein the second repeating unit comprises a repeating unit represented by the following Chemical Formula 2 and a repeating unit represented by the following Chemical Formula 3:

[Chemical Formula 2]

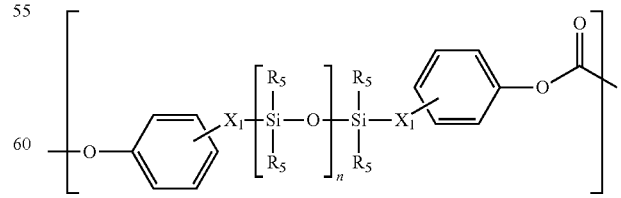

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 32 to 37,

[Chemical Formula 3]

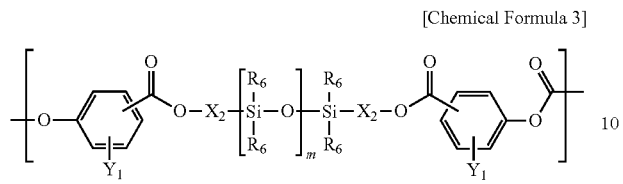

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 55 to 62.

2. The copolycarbonate of claim 1, wherein the copolycarbonate has a melt index of 3 to 20 g/10 min as measured in accordance with ASTM D1238 (conditions of 300° C. and 1.2 kg).

3. The copolycarbonate of claim 1, wherein the copolycarbonate has a weight average molecular weight of 1,000 to 100,000 g/mol.

4. The copolycarbonate of claim 1, wherein the content of the aromatic polycarbonate-based first repeating units is 90 to 99% relative to the total weight of the aromatic polycarbonate-based first repeating units and one or more aromatic polycarbonate-based second repeating units having siloxane bonds.

5. The copolycarbonate of claim 1, wherein the copolycarbonate comprises two kinds of aromatic polycarbonate-based second repeating units having siloxane bonds.

6. The copolycarbonate of claim 1, wherein the first repeating unit is represented by the following Chemical Formula 1:

[Chemical Formula 1]

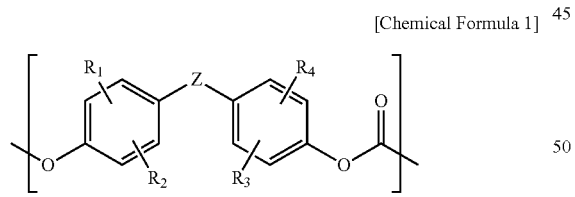

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

7. The copolycarbonate of claim 6, wherein the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

8. The copolycarbonate of claim 6, wherein the Chemical Formula 1 is represented by the following Chemical Formula 1-1:

[Chemical Formula 1-1]

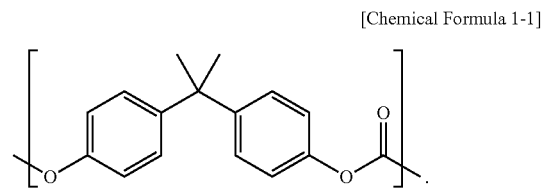

9. The copolycarbonate of claim 1, wherein the weight ratio of the repeating unit represented by Chemical Formula 2 and the repeating unit represented by Chemical Formula 3 is 1:99 to 99:1.

10. The copolycarbonate of claim 1, wherein the repeating unit represented by Chemical Formula 2 is represented by the following Chemical Formula 2-2:

[Chemical Formula 2-2]

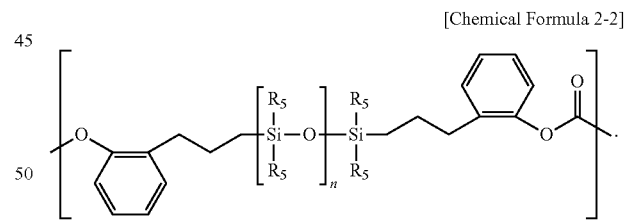

11. The copolycarbonate of claim 1, wherein the repeating unit represented by Chemical Formula 3 is represented by the following Chemical Formula 3-2:

[Chemical Formula 3-2]

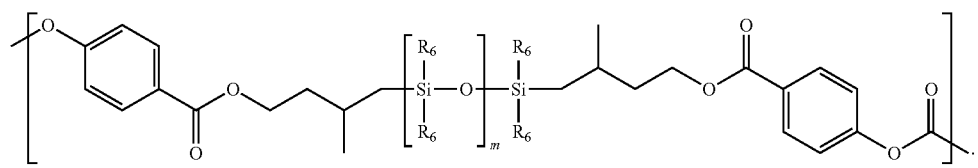

12. A polycarbonate composition comprising the copolycarbonate of claim 1, and a polycarbonate.

13. The polycarbonate composition of claim 12, wherein a polysiloxane structure is not introduced in a main chain of the polycarbonate.

14. The polycarbonate composition of claim 12, wherein the polycarbonate comprises a repeating unit represented by the following Chemical Formula 4:

[Chemical Formula 4]

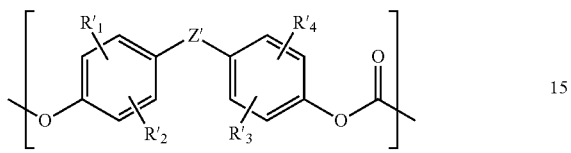

in the Chemical Formula 4, $R'_1$, $R'_2$, $R'_3$ and $R'_4$ are each independently hydrogen, $C_{1-10}$ alkyl, $C_{1-10}$ alkoxy, or halogen, and Z' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

* * * * *